United States Patent
Kida

(10) Patent No.: US 10,594,947 B2
(45) Date of Patent: Mar. 17, 2020

(54) UNDERWATER IMAGING APPARATUS, METHOD FOR CONTROLLING AN UNDERWATER IMAGING APPARATUS, AND PROGRAM FOR CONTROLLING AN UNDERWATER IMAGING APPARATUS

(71) Applicant: JVC KENWOOD CORPORATION, Yokohama-shi, Kanagawa (JP)

(72) Inventor: Shingo Kida, Kanagawa (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 99 days.

(21) Appl. No.: 15/884,574

(22) Filed: Jan. 31, 2018

(65) Prior Publication Data

US 2018/0152614 A1 May 31, 2018

Related U.S. Application Data

(63) Continuation of application No. PCT/JP2016/063142, filed on Apr. 27, 2016.

(30) Foreign Application Priority Data

Aug. 24, 2015 (JP) .................................. 2015-164419

(51) Int. Cl.
*H04N 5/235* (2006.01)
*G03B 15/02* (2006.01)
(Continued)

(52) U.S. Cl.
CPC ........... *H04N 5/2354* (2013.01); *G03B 15/02* (2013.01); *G03B 17/08* (2013.01); *H04N 5/2256* (2013.01);
(Continued)

(58) Field of Classification Search
CPC ............ H04N 5/2256; H04N 5/23222; H04N 5/2354; G03B 17/08; G03B 15/02
(Continued)

(56) References Cited

U.S. PATENT DOCUMENTS 4,769,776 A * 9/1988 Hiraoka .................... C02F 3/34
210/85
5,185,671 A * 2/1993 Lieberman ........... H04N 5/2351
348/229.1
(Continued)

FOREIGN PATENT DOCUMENTS

JP H1-168169 A 7/1989
JP H7-201712 A 8/1995
(Continued)

OTHER PUBLICATIONS

International Search Report form 237 dated Jul. 19, 2016 in corresponding International Application No. PCT/JP2016/063142.

*Primary Examiner* — Tung T Vo
(74) *Attorney, Agent, or Firm* — Nath, Goldberg & Meyer; Jerald L. Meyer; Stanley N. Protigal

(57) ABSTRACT

An imaging unit is configured to capture an image of a subject in the water. A lighting unit is configured to illuminate the subject. A histogram generator is configured to divide a range from the minimum to the maximum luminance values of a luminance signal, included in an image signal generated by capturing the image of the subject into a plurality of luminance groups, and to generate histogram data representing the distribution of frequencies of the plurality of luminance groups. Based on the generated histogram data, a histogram analyzer is configured to analyze the distribution of frequencies of the plurality of luminance groups. According to the result of the analysis for the histogram data by the histogram analyzer, a distance
(Continued)

controller is configured to control to adjust the distance between the subject and the lighting unit.

6 Claims, 16 Drawing Sheets

(51) Int. Cl.
G03B 17/08 (2006.01)
H04N 5/232 (2006.01)
H04N 5/225 (2006.01)
B63C 11/48 (2006.01)

(52) U.S. Cl.
CPC ....... *H04N 5/2351* (2013.01); *H04N 5/23222* (2013.01); *H04N 5/23229* (2013.01); *B63C 11/48* (2013.01)

(58) Field of Classification Search
USPC .......................................................... 348/81
See application file for complete search history.

(56) References Cited

U.S. PATENT DOCUMENTS

| | | | | |
|---|---|---|---|---|
| 6,192,145 | B1* | 2/2001 | Anandan | G06K 9/209 |
| | | | | 382/154 |
| 9,258,489 | B2* | 2/2016 | Lee | H04N 5/2354 |
| 2007/0237505 | A1* | 10/2007 | Takita | G03B 7/16 |
| | | | | 396/25 |
| 2008/0069433 | A1* | 3/2008 | Corcoran | G06K 9/40 |
| | | | | 382/149 |
| 2008/0151057 | A1* | 6/2008 | Takita | G03B 17/08 |
| | | | | 348/207.1 |
| 2015/0312487 | A1* | 10/2015 | Nomoto | H04N 5/2621 |
| | | | | 348/239 |
| 2017/0053384 | A1* | 2/2017 | Toda | G06T 5/001 |
| 2017/0293217 | A1* | 10/2017 | Gallager | G03B 41/00 |

FOREIGN PATENT DOCUMENTS

| | | |
|---|---|---|
| JP | H7-220058 A | 8/1995 |
| JP | H10-7084 A | 1/1998 |
| JP | 2009-300871 A | 12/2009 |
| JP | 2010-28178 A | 2/2010 |
| JP | 2012-137706 A | 7/2012 |
| JP | 2013-220254 A | 10/2013 |
| WO | 2013/038550 A1 | 3/2013 |

* cited by examiner (a)

(b)

(c)

(d)

(e)

UNDERWATER IMAGING APPARATUS, METHOD FOR CONTROLLING AN UNDERWATER IMAGING APPARATUS, AND PROGRAM FOR CONTROLLING AN UNDERWATER IMAGING APPARATUS

CROSS REFERENCE TO RELATED APPLICATION

This application is a Continuation of PCT Application No. PCT/JP2016/063142, filed on Apr. 27, 2016, and claims the priority of Japanese Patent Application No. 2015-164419, filed on Aug. 24, 2015, the entire contents of both of which are incorporated herein by reference.

BACKGROUND

The present disclosure relates to an underwater imaging apparatus which captures an image of a subject underwater, a method for controlling the underwater imaging apparatus, and a program for controlling the underwater imaging apparatus.

Wall surfaces of dams storing water are an example of underwater structures. To inspect whether wall surfaces in the water are deteriorated, underwater imaging apparatuses are used in some cases. Such an underwater imaging apparatus is immersed in the water to capture an image of the wall surface. Based on the captured image, the inspector checks whether the wall surface is deteriorated.

SUMMARY

Sunlight does not sufficiently reach deep places in the water. Underwater imaging apparatuses therefore include lighting apparatuses and capture images of wall surfaces while projecting light onto the wall surfaces. However, some of the images captured in such a manner are too dark or too light, depending on lighting conditions. The inspector is not able to accurately determine whether the wall surface is deteriorated based on the captured images.

A first aspect of the embodiments provides an underwater imaging apparatus, including: an imaging unit configured to capture an image of a subject in the water; a lighting unit configured to illuminate the subject; a histogram generator configured to divide a range from the minimum to the maximum luminance values of a luminance signal included in an image signal generated by capturing the image of the subject into a plurality of luminance groups, and to generate histogram data representing the distribution of frequencies of the plurality of luminance groups; a histogram analyzer configured, based on the generated histogram data, to analyze the distribution of frequencies of the plurality of luminance groups; and a distance controller configured to control to adjust the distance between the subject and the lighting unit according to the result of the analysis for the histogram data by the histogram analyzer.

A second aspect of the embodiments provides an underwater imaging apparatus control method, including: by an imaging unit, capturing an image of a subject in the water; by a histogram generator, dividing a range from the minimum to the maximum luminance values of a luminance signal included in an image signal generated by capturing the image of the subject, into a plurality of luminance groups, and generating histogram data representing the distribution of frequencies of the plurality of luminance groups; by a histogram analyzer, based on the generated histogram data, analyzing the distribution of frequencies of the plurality of luminance groups; and by a distance controller, according to the result of the analysis for the histogram data by the histogram analyzer, adjusting the distance between the subject and a lighting unit which illuminates the subject.

A third aspect of the embodiments provides an underwater imaging apparatus control program stored in a non-transitory storage medium, the program causing a computer to execute: a step of dividing a range from the minimum to the maximum luminance values of a luminance signal included in an image signal generated by capturing an image of a subject in the water into a plurality of luminance groups, and generating histogram data representing the distribution of frequencies of the plurality of luminance groups; a step of, based on the generated histogram data, analyzing the distribution of frequencies of the plurality of luminance groups; and a step of, according to the result of the analysis for the histogram data by the histogram analyzer, adjusting the distance between the subject and a lighting unit which illuminates the subject.

DETAILED DESCRIPTION

Hereinafter, a description is given of an underwater imaging apparatus, a method for controlling an underwater imaging apparatus, and a program for controlling an underwater imaging apparatus, according to each embodiment, with reference to the accompanying drawings.

First Embodiment

Figure 1:
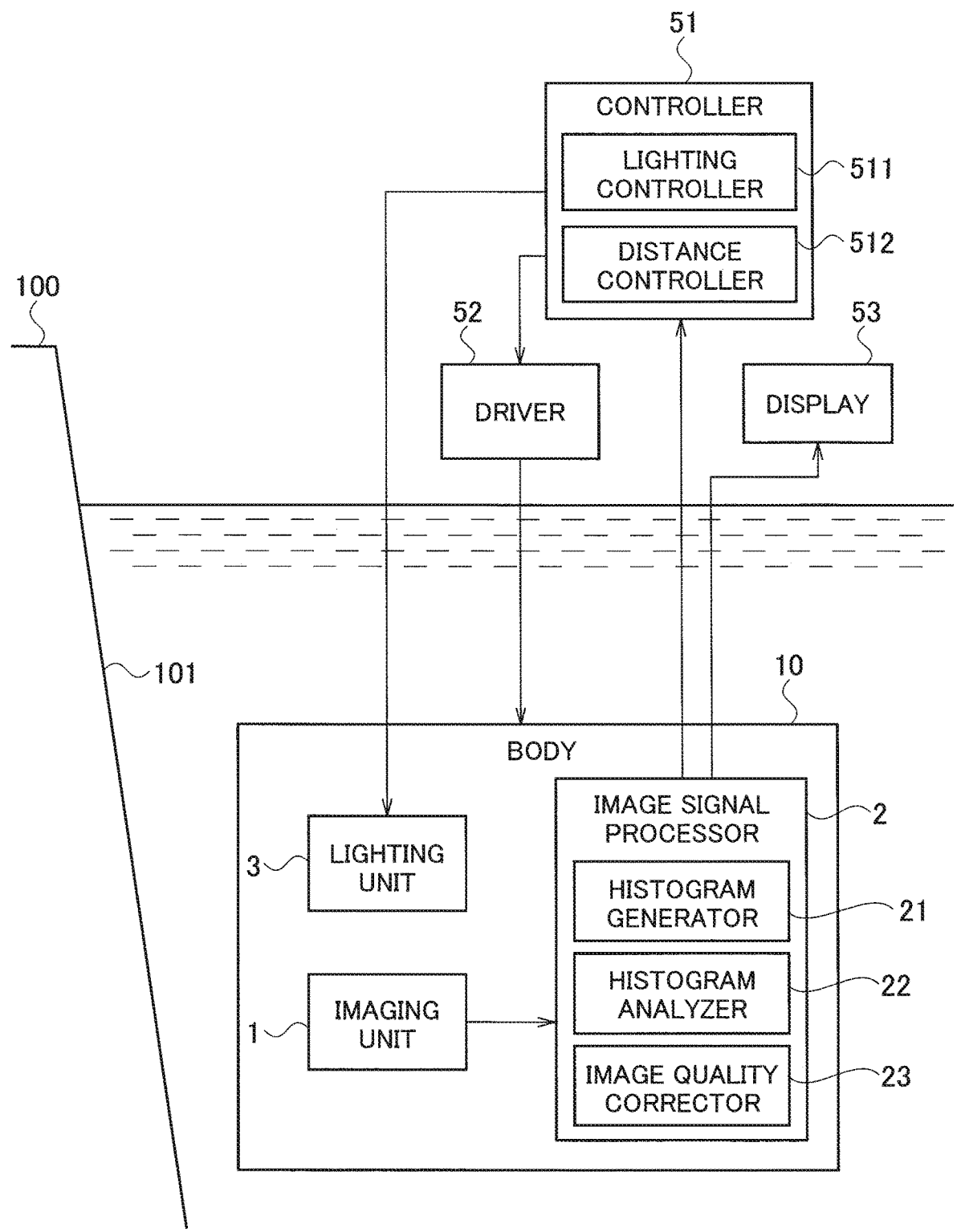
FIG. 1 is a block diagram illustrating an underwater imaging apparatus according to the first embodiment.

In FIG. 1, a dam 100 stores water. Most of a wall surface 101 of the dam 100 is underwater. The wall surface 101 of the dam 100 is an example of underwater structures. The underwater imaging apparatus includes a body 10, which is immersed in the water. The underwater imaging apparatus (the body 10) captures an image of the wall surface 101. An inspector checks whether the wall surface 101 is deteriorated based on the captured image of the wall surface 101.

In the first embodiment, the body 10 is hung by wire, for example, from above the water. The body 10 is configured to move toward and away from the wall surface 101.

The body 10 includes: an imaging unit 1 configured to capture an image of the wall surface 101; an image signal processor 2 configured to process an image signal outputted from the imaging unit 1; and a lighting unit 3 configured to illuminate the wall surface 101. The wall surface 101 is a subject. The imaging unit 1 includes a CCD or CMOS. The lighting unit 3 can be composed of any light source.

The image signal processor 2 includes: a histogram generator 21, a histogram analyzer 22; and an image quality corrector 23. The histogram generator 21 generates histogram data based on a luminance signal included in the image signal. The histogram analyzer 22 analyzes the histogram data. The image quality corrector 23 corrects the image signal for image quality correction. The image signal processor 2 may be composed of a hardware circuit, or all or a part thereof may be composed of software (a computer program).

The concrete way to generate the histogram data by the histogram generator 21 and the concrete way to analyze the histogram data by the histogram analyzer 22 are described later.

The underwater imaging apparatus further includes a controller 51, a driver 52, and a display 53, which are situated on the water or on the ground. The controller 51 includes a lighting controller 511 and a distance controller 512. The lighting controller 511 controls lighting by the lighting unit 3. The distance controller 512 controls the distance between the body 10 and the wall surface 101.

The controller 51 can be composed of a personal computer, a microcomputer, a microprocessor, or the like. The driver 52 can be composed of any driving mechanism. The display 53 can be composed of any display such as a liquid crystal panel.

The controller 51 is supplied with data representing the result of analyzing the histogram data by the histogram analysis unit 22.

The driver 52 drives and moves the body 10, which is hung by wire, in the horizontal direction. In addition to the horizontal direction, the driver 52 drives and moves the body 10 in the vertical direction. The display 53 displays the image signal outputted from the image signal processor 2. The inspector watches the image displayed on the display 53 to check whether the wall surface 101 is deteriorated.

Figure 2:
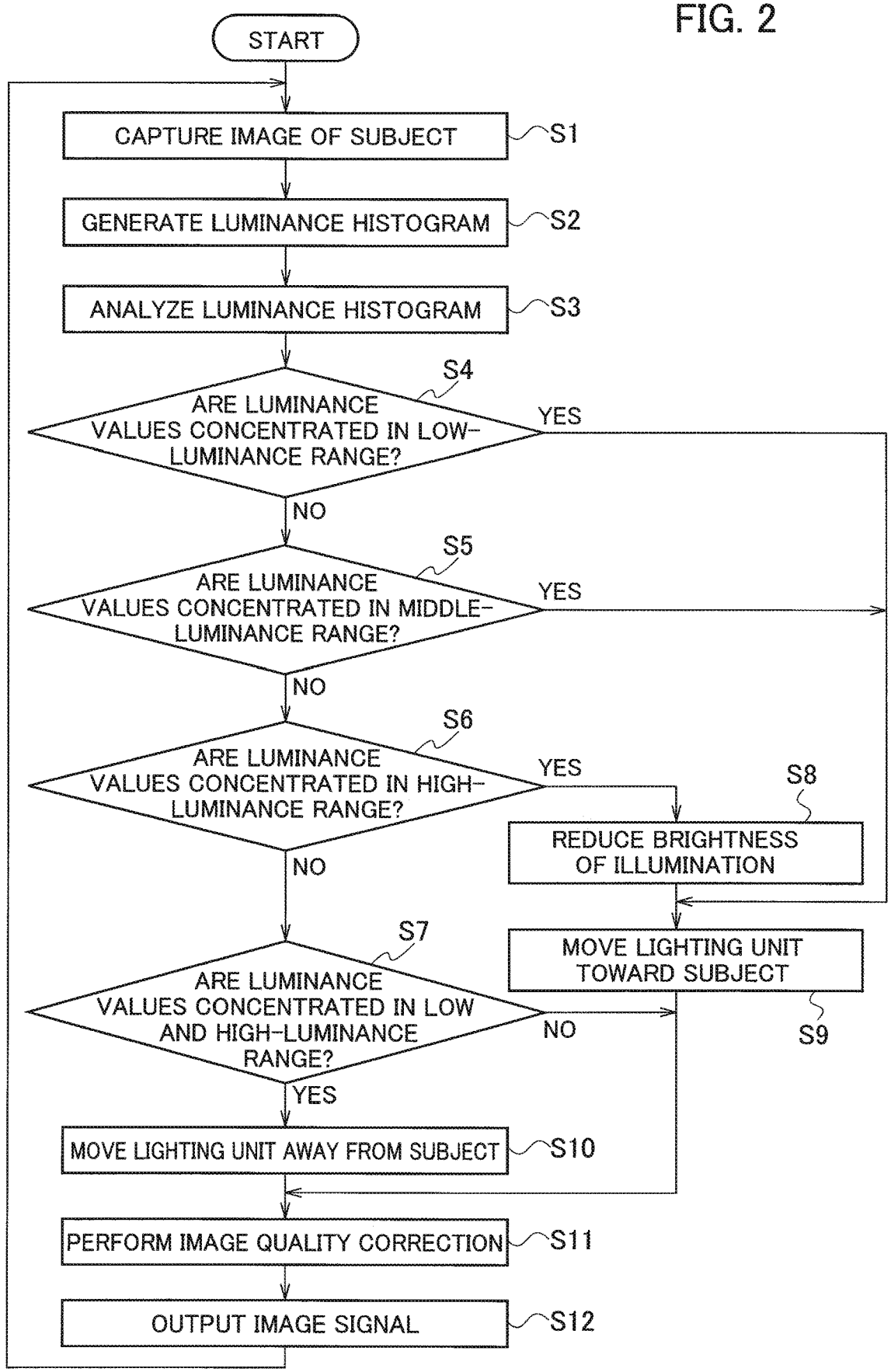
FIG. 2 is a flowchart for explaining the operation of the underwater imaging apparatus of each embodiment and a method and a program for controlling the underwater imaging apparatus according to each embodiment.

Using the flowchart illustrated in FIG. 2, the operation of the underwater imaging apparatus t and the method for controlling the underwater imaging apparatus, according to the first embodiment, are concretely described. In FIG. 2, the imaging unit 1 captures an image of a subject (the wall surface 101 herein) in step S1. In step S2, the histogram generator 21 generates histogram data (a luminance histogram) based on the luminance signal included in the image signal.

The histogram generator 21 divides all the luminance levels of the luminance signal into a plurality of luminance groups. The histogram generator 21 then counts the number of pixels included in each luminance group to generate histogram data. The image signal has 256 levels of luminance, for example. The histogram generator 21 divides all the luminance levels of the luminance signal into 16 luminance groups, for example.

Figure 4A:
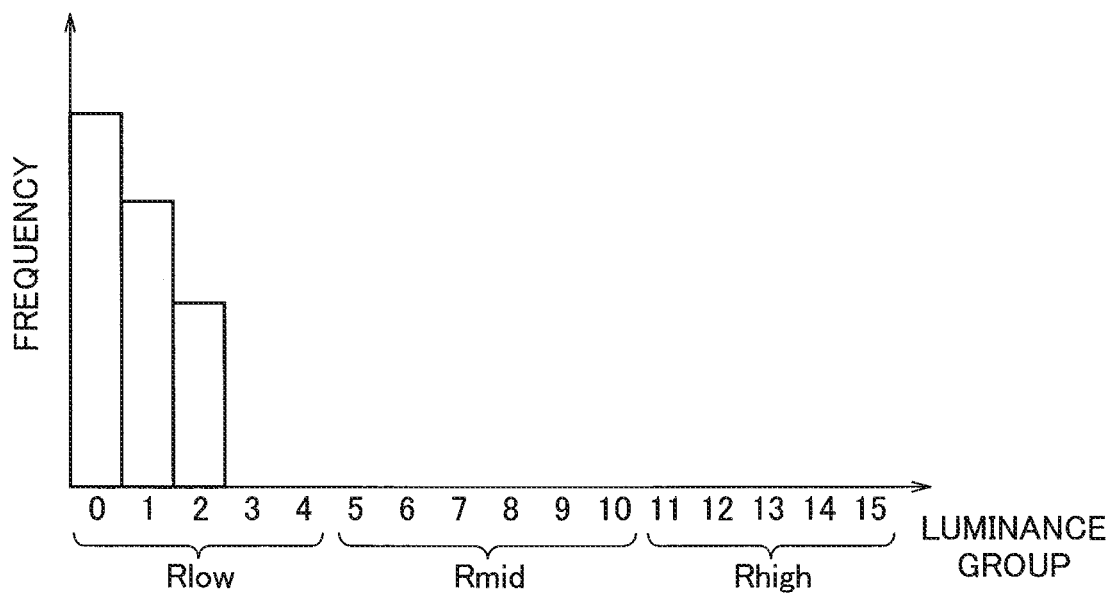
FIG. 4A is a diagram illustrating a luminance histogram of the image illustrated in FIG. 3A.

FIG. 4A illustrates an example of the histogram data. In FIG. 4A, luminance groups 0 to 4 located on the low luminance side constitutes a low-luminance range Rlow; luminance groups 11 to 15 located on the high luminance side constitute a high-luminance range Rhigh; and luminance groups 5 to 15 located between the low and high-luminance ranges Rlow and Rhigh constitute a middle-luminance range Rmid. The above-described way to divide the low, middle, and high-luminance ranges Rlow, Rmid, and Rhigh is just an example and is not limited to that illustrated in FIG. 4A.

In step S3, the histogram analyzer 22 analyzes the distribution of luminance values of the luminance signal in the low-luminance range Rlow, middle-luminance range Rmid, and high luminance range Rhigh.

The histogram analyzer 22 calculates a total sum Hist_sum in the histogram based on Equation (1). Hist [i] is a frequency of each of the luminance groups 0 to 15.

$$\text{Hist\_sum} = \sum_{i=0}^{i=15} \text{Hist}[i] \qquad (1)$$

The histogram analyzer 22 calculates: a low-luminance concentration rate Low_rate based on Equation (2); a middle-luminance concentration rate Mid_rate based on Equation (3); and a high-luminance concentration rate High_ rate based on Equation (4).

$$Low\_rate=(Hist[0]+Hist[1]+Hist[2]+Hist[3]+Hist[4])\times 100/Hist\_sum \quad (2)$$

$$Mid\_rate=(Hist[5]+Hist[6]+Hist[7]+Hist[8]+Hist[9]+Hist[10])\times 100/Hist\_sum \quad (3)$$

$$High\_rate=(Hist[11]+Hist[12]+Hist[13]+Hist[14]+Hist[15])\times 100/Hist\_sum. \quad (4)$$

Equations (2) to (4) to calculate the low, middle, and high-luminance concentration rates Low_rate, Mid_rate, and High_rate are just an example. The formula to calculate the low, middle, and high-luminance concentration rates Low_rate, Mid_rate, and High_rate is not limited to Equations (2) to (4). The histogram analyzer 22 can calculate the rate of concentration of frequencies in each of the low, middle, and high-luminance ranges Rlow, Rmid, and Rhigh using any calculation formula.

In step S4, the histogram analyzer 22 determines whether luminance values of the luminance signal are concentrated in the low-luminance range Rlow. The histogram analyzer 22 determines that luminance values are concentrated in the low-luminance range Rlow when the analysis of the histogram shows that luminance values are concentrated in the low-luminance range Rlow at or above a predetermined concentration rate. For instance, the histogram analyzer 22 determines that luminance values of the luminance signal are concentrated in the low-luminance range Rlow when the low-luminance concentration rate Low_rate is equal to or greater than 60%.

Figure 3A:
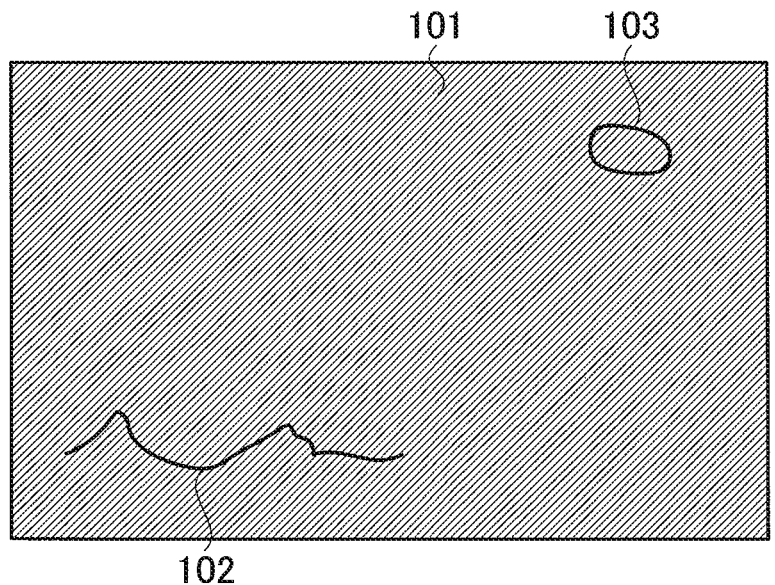
FIG. 3A is a diagram illustrating an example image in which luminance values are concentrated in a low-luminance range.

FIG. 3A is an example image in which luminance values are concentrated in the low-luminance range Rlow. In diagrams illustrating images in FIG. 3A and in the following figures, each image shows a crack 102 and a dent 103 in the wall surface 101.

When the body 10 is distant from the wall surface 101, light from the lighting unit 3 does not sufficiently reach the wall surface 101 in some cases, and the captured image is dark. In the luminance histogram obtained at this time, luminance values are concentrated in the low-luminance range Rlow as illustrated in FIG. 4A.

When it is determined in step S4 that luminance values are concentrated in the low-luminance range Rlow (YES), the distance controller 512 controls the driver 52 so that the lighting unit 3 (that is, the body 10) moves toward the wall surface 101 in step S9.

Figure 3B:
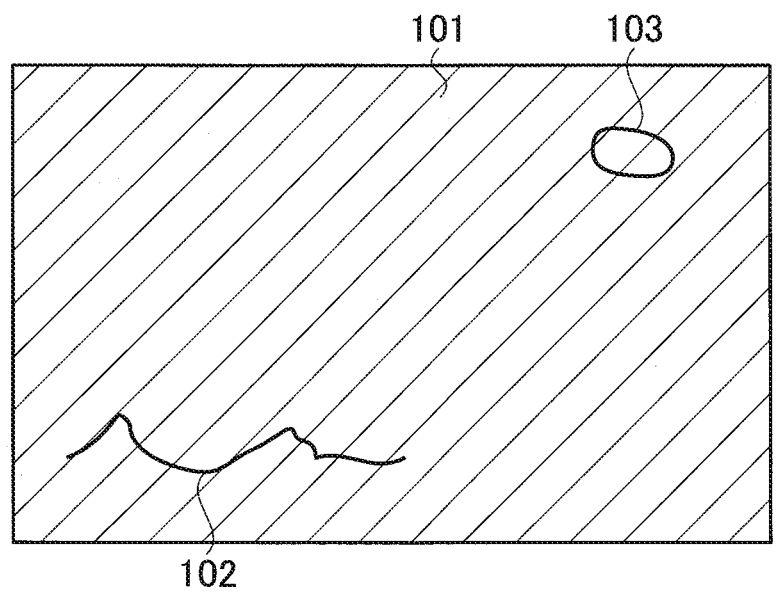
FIG. 3B is a diagram illustrating an image captured after the distance between a lighting unit and a subject is adjusted in the state of FIG. 3A.

When the lighting unit 3 moves toward the wall surface 101, the image becomes brighter as illustrated in FIG. 3B. In the luminance histogram obtained at this time, luminance values are distributed across the low-luminance range Rlow to high-luminance range Rhigh, mainly in the middle-luminance range Rmid. Accordingly, the crack 102 and dent 103 in the wall surface 101 are identified more easily.

Figure 5:
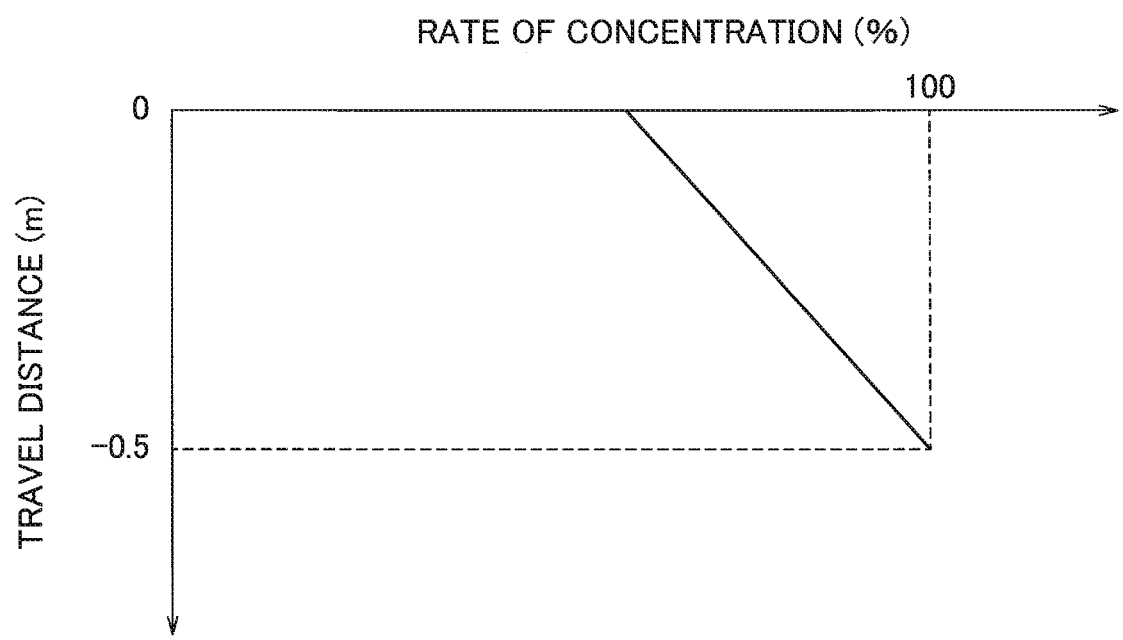
FIG. 5 is a diagram illustrating an example of the way to move the lighting unit in accordance with the rate of concentration in step S9 of FIG. 2.

In step S9, the distance controller 512 preferably moves the lighting unit 3 by a travel distance corresponding to the low-luminance concentration rate Low_rate as illustrated in FIG. 5. The concentration rate illustrated in FIG. 5 refers to the low-luminance concentration rate Low_rate when the process goes to step S9 from step S4.

The distance controller 512 linearly increases the travel distance as the low-luminance concentration rate Low_rate increases from a predetermined value to 100%. The symbol "−" of the travel distance in FIG. 5 means that the lighting unit 3 moves toward the wall surface 101.

After step S9, the process goes to step S11. When it is not determined in step S4 that luminance values are concentrated in the low-luminance range Rlow (NO), the process goes to step S5.

In step S5, the histogram analyzer 22 determines whether luminance values are concentrated in the middle-luminance range Rmid. The histogram analyzer 22 determines that luminance values are concentrated in the middle-luminance range Rmid when the analysis of the histogram shows that luminance values are concentrated in the middle-luminance range Rmid at or above a predetermined concentration rate. Specifically, the histogram analyzer 22 determines that luminance values of the luminance signal are concentrated in the middle-luminance range Rmid when the middle-luminance concentration rate Mid_rate is equal to or greater than 60%.

Figure 6A:
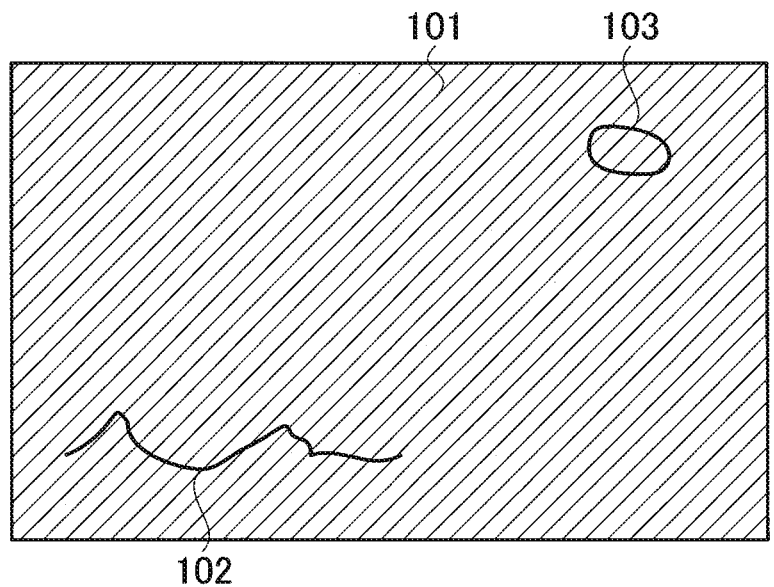
FIG. 6A is an example image in which luminance values are concentrated in a middle-luminance range.
Figure 7A:
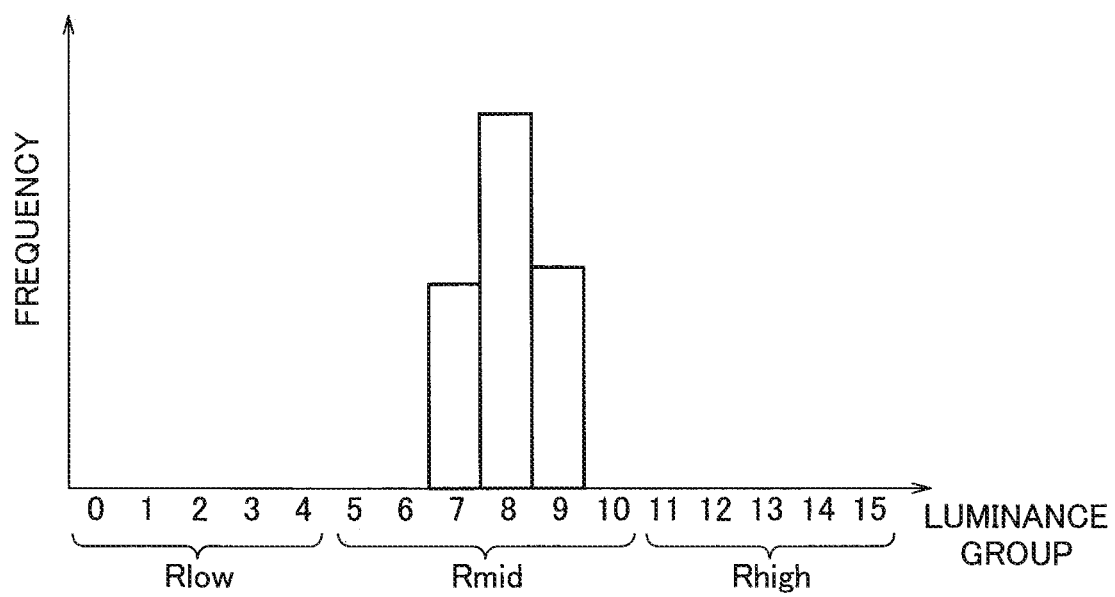
FIG. 7A is a diagram illustrating a luminance histogram of the image illustrated in FIG. 6A.

FIG. 6A is an image example in which luminance values are concentrated in the middle-luminance range Rmid. Typically, due to water muddiness, images captured under water tend to have luminance values concentrated in the middle-luminance range Rmid and are likely to have low contrast. In the luminance histogram obtained at this time, as illustrated in FIG. 7A, luminance values are concentrated in the middle-luminance range Rmid.

When it is determined in step S5 that luminance values are concentrated in the middle-luminance range Rmid (YES), the distance controller 512 controls the driver 52 in step S9 so that the lighting unit 3 moves toward the wall surface 101.

Figure 6B:
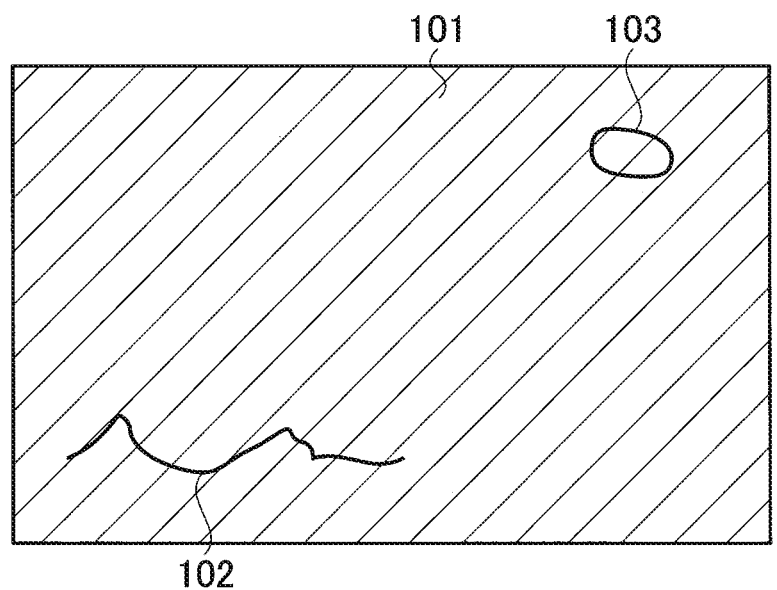
FIG. 6B is a diagram illustrating an image captured after the distance between the lighting unit and subject is adjusted in the state of FIG. 6A.
Figure 7B:
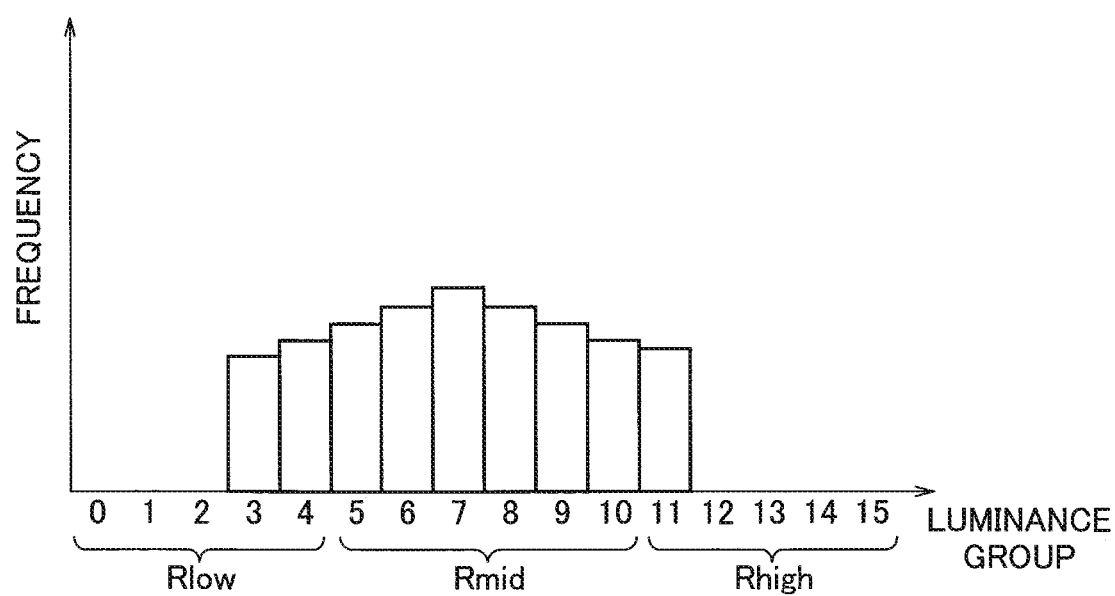
FIG. 7B is a diagram illustrating a luminance histogram of the image illustrated in FIG. 6B.

When the body 10 moves toward the wall surface 101, the image becomes brighter as illustrated in FIG. 6B. In the luminance histogram obtained at this time, as illustrated in FIG. 7B, the luminance values are distributed across the low-luminance range Rlow to the high-luminance range Rhigh, mainly in the middle-luminance range Rmid. The crack 102 and dent 103 in the wall surface 101 are therefore easily identified.

In step S9, the distance controller 512 preferably moves the body 10 so that the travel distance linearly increases as the middle-luminance concentration rate Mid_rate increases from a predetermined value to 100% as illustrated in FIG. 5. The concentration rate in FIG. 5 refers to the middle-luminance concentration rate Mid_rate when the process goes to step S9 from step S5.

When it is not determined in step S5 that luminance values are concentrated in the middle-luminance range Rmid (NO), the process goes to step S6.

In step S6, the histogram analyzer 22 determines whether luminance values are concentrated in the high-luminance range Rhigh. The histogram analyzer 22 determines that luminance values are concentrated in the high-luminance section Rhigh when the analysis of the histogram shows that luminance values are concentrated in the high-luminance range Rhigh at or above a predetermined concentration rate. Specifically, the histogram analyzer 22 determines that luminance values are concentrated in the high-luminance range Rhigh when the high-luminance concentration rate High_rate is equal to or greater than 60%.

Figure 8A:
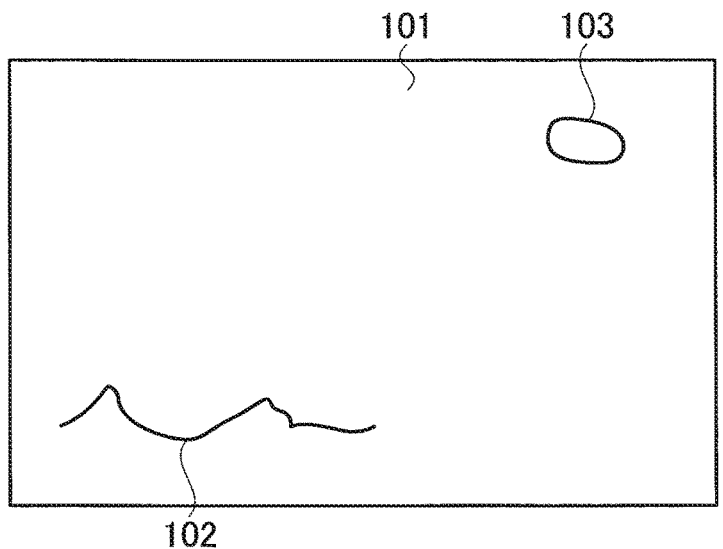
FIG. 8A is an example image in which luminance values are concentrated in a high-luminance range.
Figure 9A:
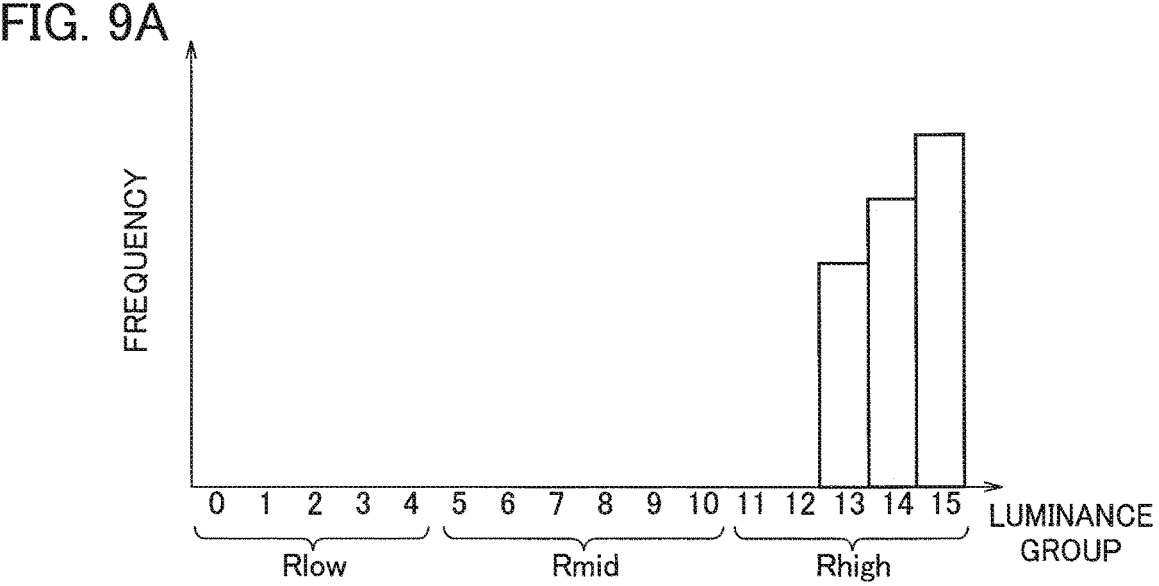
FIG. 9A is a diagram illustrating a luminance histogram of the image illustrated in FIG. 8A.

FIG. 8A is an example image in which luminance values are concentrated in the high-luminance range Rhigh. In the luminance histogram obtained at this time, as illustrated in FIG. 9A, luminance values are concentrated in the high-luminance range Rhigh.

Figure 8B:
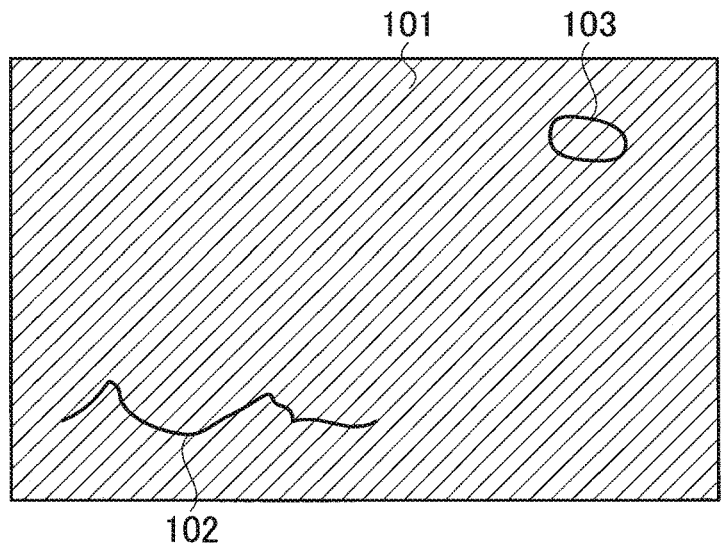
FIG. 8B is a diagram illustrating an image captured after the brightness of illumination is reduced in the state of FIG. 8A.
Figure 8C:
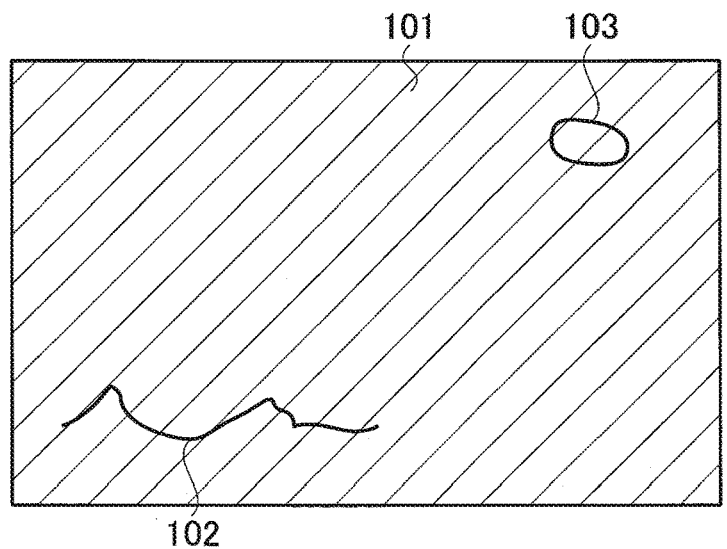
FIG. 8C is a diagram illustrating an image captured after the distance between the lighting unit and subject is adjusted in the state of FIG. 8B.
Figure 9B:
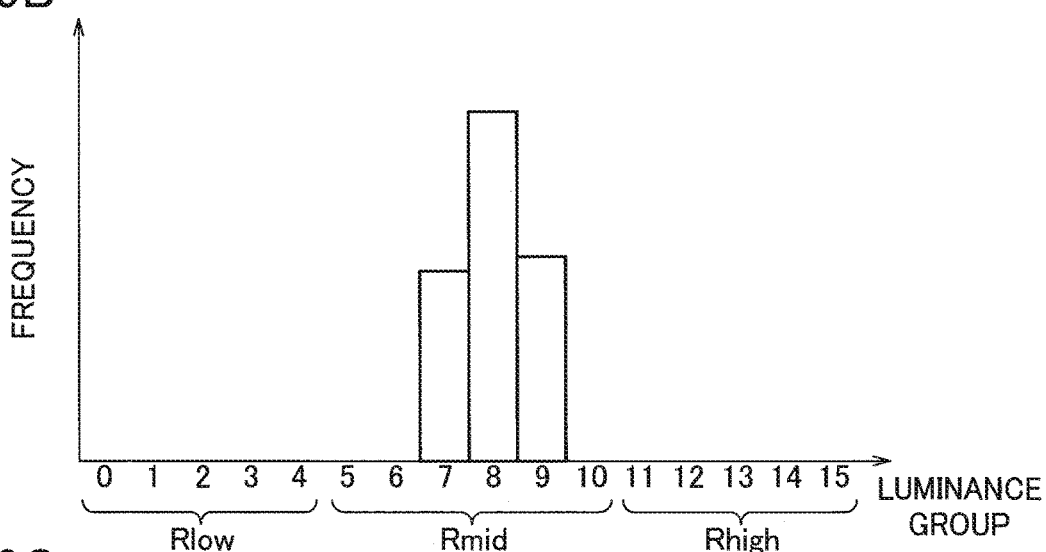
FIG. 9B is a diagram illustrating a luminance histogram of the image illustrated in FIG. 8B.
Figure 9C:
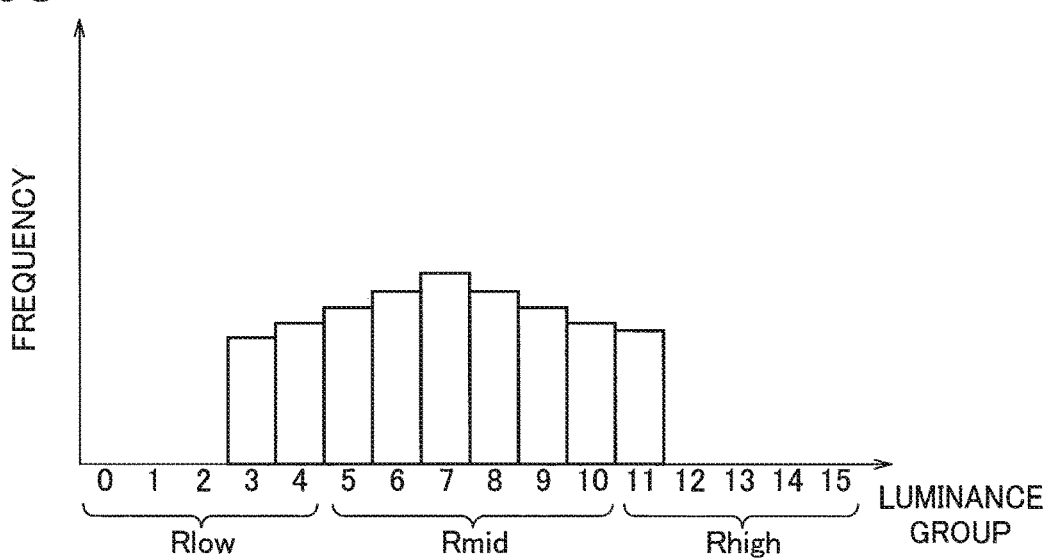
FIG. 9C is a diagram illustrating a luminance histogram of the image illustrated in FIG. 8C.

When it is determined in step S6 that luminance values are concentrated in the high-luminance range Rhigh (YES), the lighting controller 511 controls the lighting unit 3 so that the brightness of lighting is reduced in step S8. The image is then in the state illustrated in FIG. 8B. In the luminance histogram obtained at this time, as illustrated in FIG. 9B, luminance values are concentrated in the middle-luminance range Rmid.

The distance controller 512 subsequently controls the driver 52 so that the lighting unit 3 moves toward the wall surface 101 in step S9. The image is then in the state illustrated in FIG. 8O. In the luminance histogram obtained at this time, as illustrated in FIG. 9O, luminance values are distributed across the low-luminance range Rlow to the high-luminance range Rhigh, mainly in the middle-luminance range Rmid. The crack 102 and dent 103 in the wall surface 101 are easily identified.

In step S9, the distance controller 512 preferably moves the lighting unit 3 so that the travel distance linearly increases as the high-luminance concentration rate High_rate increases from a predetermined value to 100% as illustrated in FIG. 5. The concentration rate illustrated in FIG. 5 refers to the high-luminance concentration rate High_rate when the process goes to step S9 from step S6 and S8.

When it is not determined in step S6 that luminance values are concentrated in the high-luminance range Rhigh (No), the process goes to step S7.

The histogram analyzer 22 determines in step S7 whether luminance values are concentrated both in the low and high-luminance ranges Rlow and Rhigh.

Figure 10A:
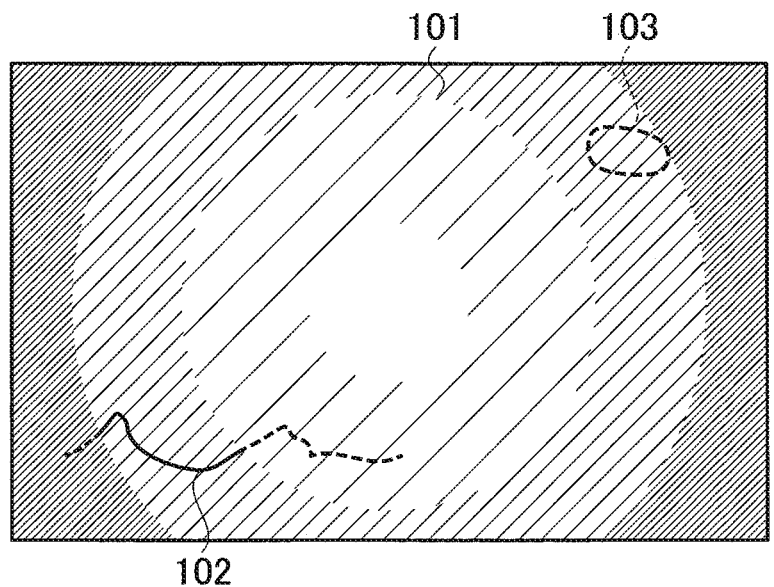
FIG. 10A is a diagram illustrating an example image in which luminance values are concentrated in the low and high-luminance ranges.
Figure 11A:
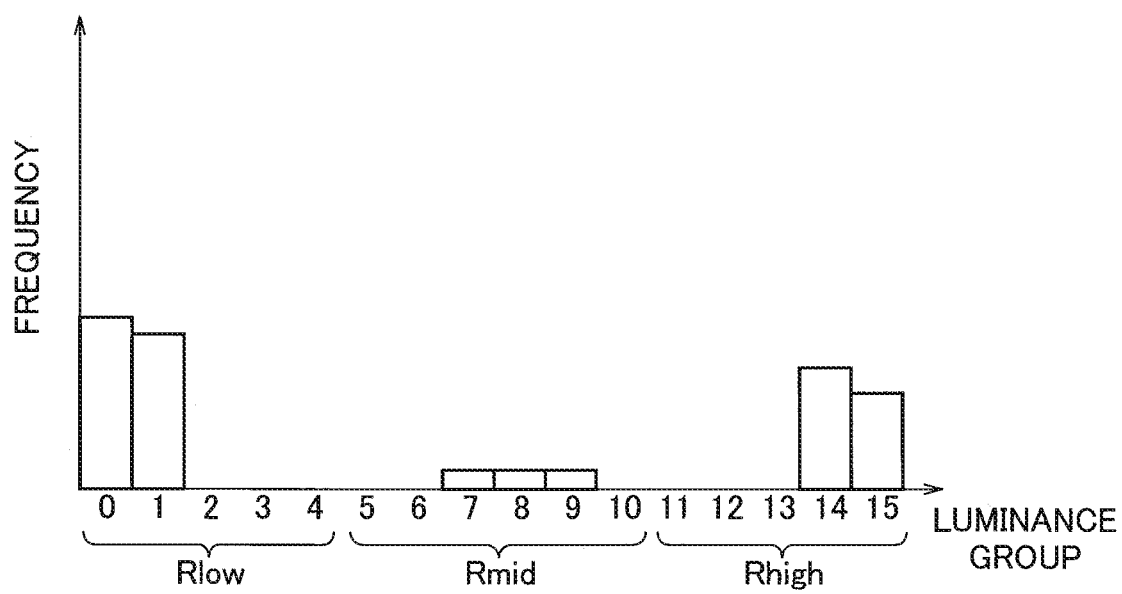
FIG. 11A is a diagram illustrating a luminance histogram of the image illustrated in FIG. 10A.

If the body 10 is too close to the wall surface 101, the wall surface 101 is locally illuminated. An area of the image is extremely bright while other areas corresponding to not-illuminated part are dark, as illustrated in FIG. 10A. In FIG. 10A, the levels of brightness decreasing outward from the brightest circular center are illustrated by grades of hatching for convenience. In the luminance histogram obtained at this time, as illustrated in FIG. 11A, luminance values are concentrated in both the low and high-luminance ranges Rlow and Rhigh.

The histogram analysis unit 22 determines whether the following conditions are satisfied in which: the low-luminance concentration rate Low_rate is higher than the middle-luminance concentration rate Mid_rate and the high-luminance concentration rate High_rate is higher than the middle-luminance concentration rate Mid-rate. When this condition is satisfied, the histogram analyzer 22 determines that the image is in the state illustrated in FIG. 10A.

When it is determined in step S7 that luminance values are concentrated in the low and high-luminance ranges Rlow and Rhigh (YES), in step S10, the distance controller 512 controls the driver 52 so that the lighting unit 3 moves away from the wall surface 101.

Figure 10B:
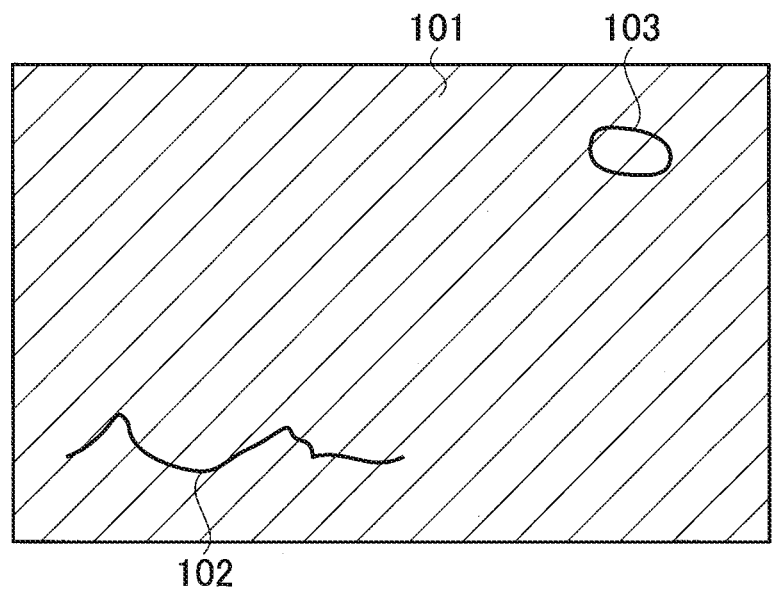
FIG. 10B is a diagram illustrating an image which is captured after the distance from the lighting unit and subject is adjusted in the state of FIG. 10A.
Figure 11B:
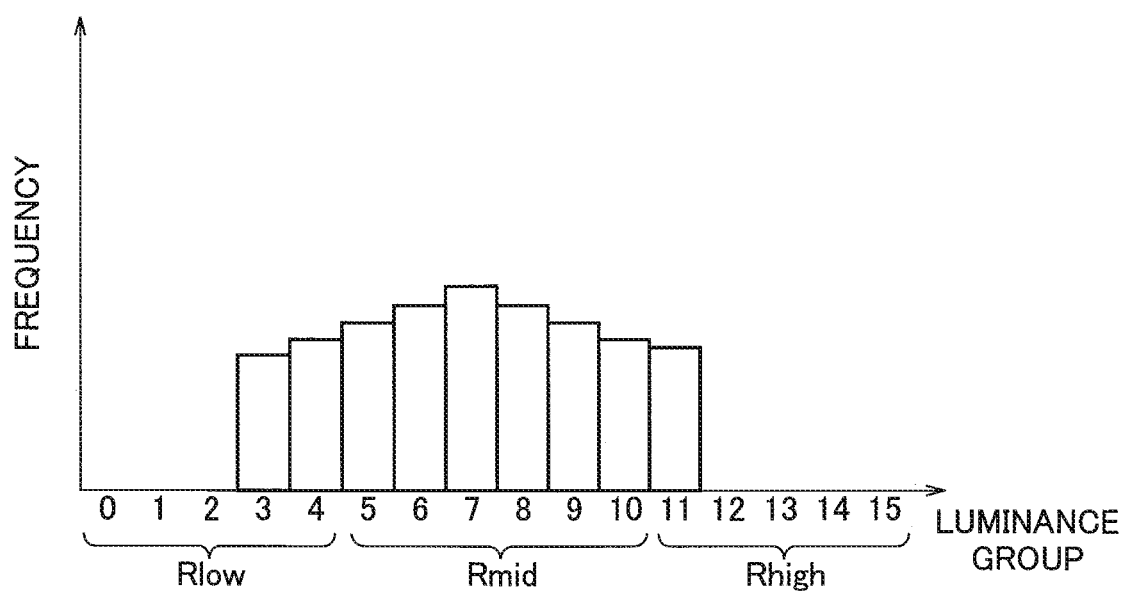
FIG. 11B is a diagram illustrating a luminance histogram of the image illustrated in FIG. 10B.

The image is then in the state illustrated in FIG. 10B. In the luminance histogram obtained at this time, as illustrated in FIG. 11B, luminance values are distributed across the low-luminance range Rlow to the high-luminance range Rhigh, mainly in the middle-luminance range Rmid. The crack 102 and dent 103 in the wall surface 101 are easily identified.

After step S10, the process goes to step S11. When it is not determined in step S7 that luminance values are concentrated in the low and high-luminance ranges Rlow and Rhigh (NO), the process goes to step S11.

In step S11, the image quality corrector 23 performs an image quality correction process for the image signal. In step S12, the image signal processor 2 outputs the image signal subjected to the image quality correction process. After step S12, the process returns to step S1, and steps S1 to S12 are repeated.

Figure 4B:
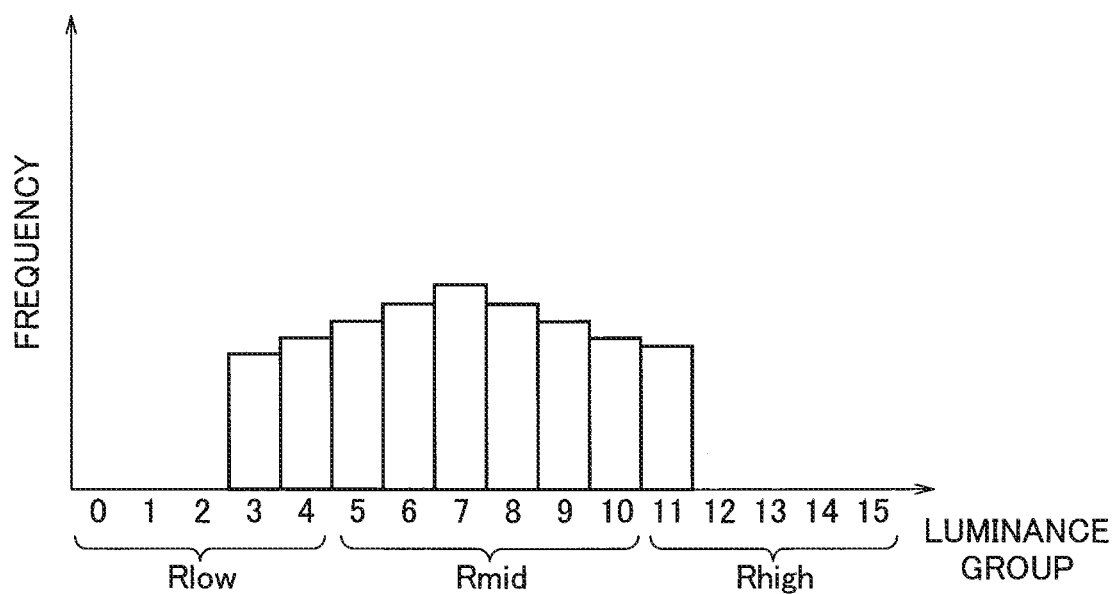
FIG. 4B is a diagram illustrating a luminance histogram of the image illustrated in FIG. 3B.

As described above, when luminance values in the image signal generated by capturing an image of a subject are concentrated in the low or middle-luminance range Rlow or Rmid, the lighting unit 3 moves toward the subject. The image thereby has appropriate brightness as illustrated in FIG. 3B or 6B and provides a luminance histogram in which luminance values are distributed across a wide range as illustrated in FIG. 4B or 7B.

When luminance values in the image signal are concentrated in the high-luminance range Rhigh, the brightness of the lighting by the lighting unit 3 is reduced, and the lighting unit 3 moves toward the subject. The obtained image thereby has appropriate brightness as illustrated in FIG. 8O, and provides a luminance histogram in which luminance values are distributed across a wide range as illustrated in FIG. 9O.

When luminance values in the image signal are concentrated in the low and high-luminance ranges Rlow and Rhigh, the lighting unit 3 is moved away from the subject. The obtained image thereby has an appropriate brightness illustrated in FIG. 10B, and provides a luminance histogram in which luminance values are distributed across a wide range as illustrated in FIG. 11B.

The determination "NO" in steps S4 to S7 means that the generated image signal represents an image that originally has appropriate brightness and provides a luminance histogram in which luminance values are distributed across a wide range.

Figure 12:
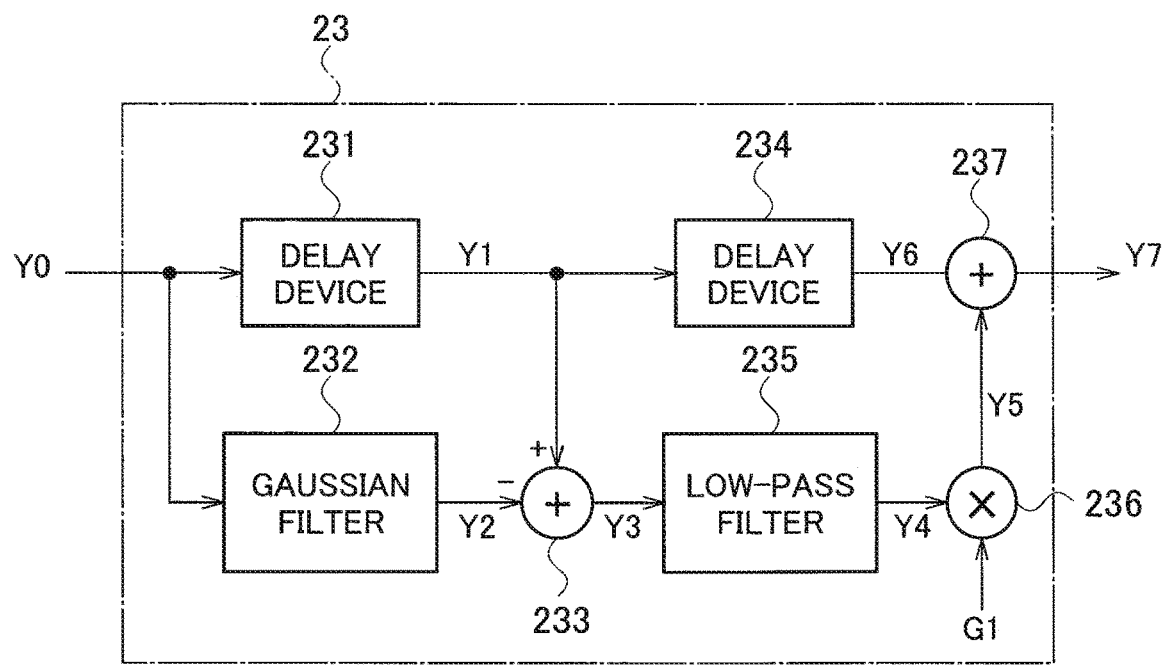
FIG. 12 is a block diagram illustrating a specific configuration example of an image quality corrector included in the underwater imaging apparatus according to each embodiment.
Figure 13:
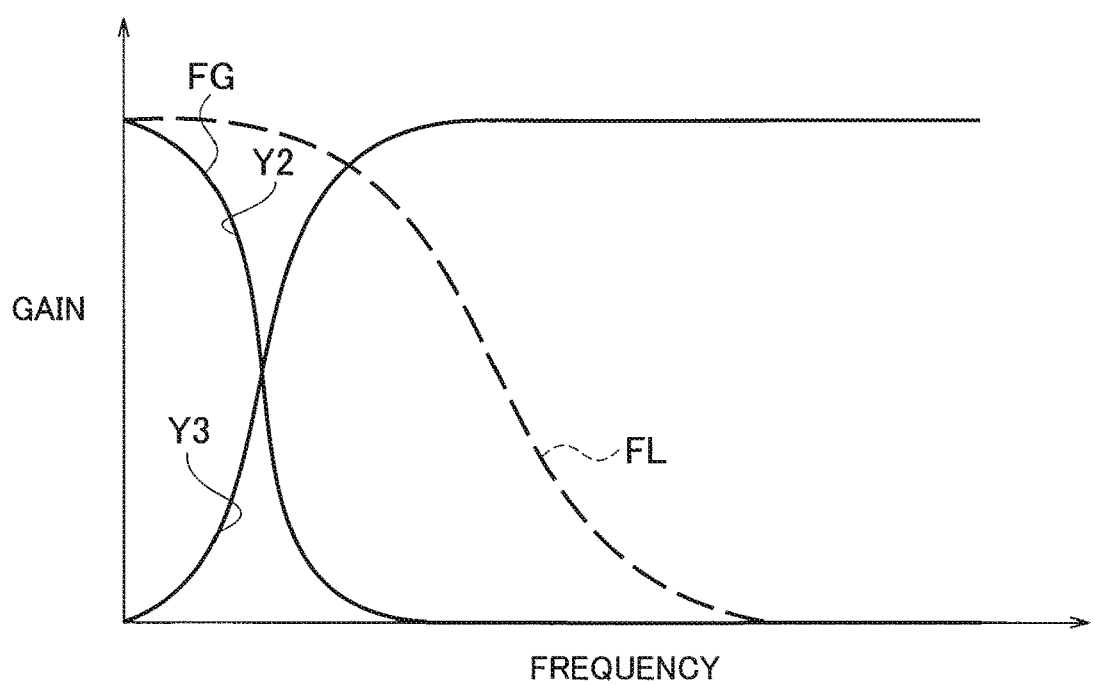
FIG. 13 is a diagram illustrating frequency characteristics for explaining the operation of the image quality corrector illustrated in FIG. 12.
Figure 14:
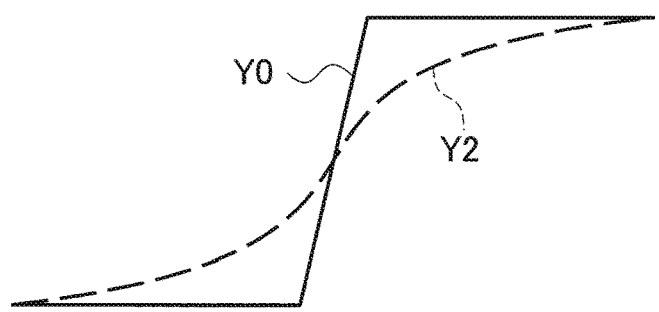
FIG. 14 is a waveform diagram for explaining the operation of the image quality corrector illustrated in FIG. 12.
Figure 14:
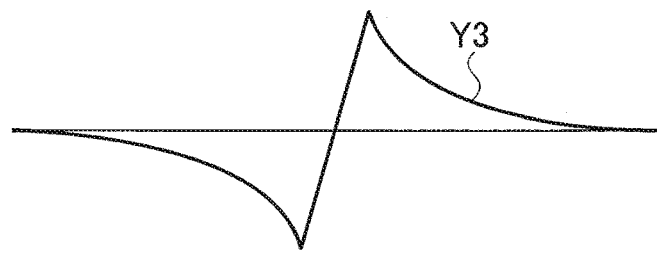
Figure 14:
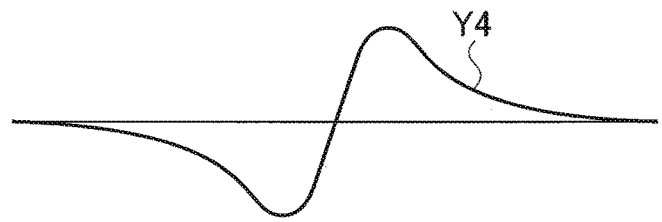
Figure 14:
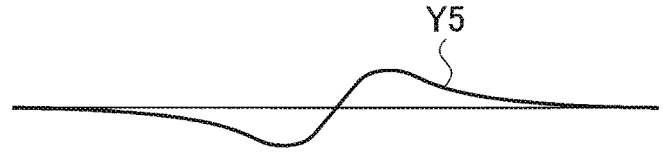
Figure 14:
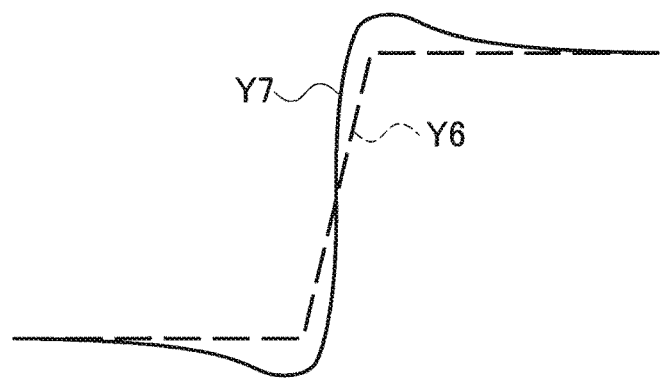

Herein, a description is given of a concrete configuration example of the image quality corrector 23 and the image quality correction process executed by the concrete configuration example, by using FIGS. 12-14.

As illustrated in FIG. 12, the image quality corrector 23 includes a delay device 231, a Gaussian filter 232, a subtractor 233, a delay device 234, a low-pass filter 235, a multiplier 236, and an adder 237. Each component in the image quality corrector 23 may be composed of a hardware circuit, or all or a part thereof may be composed of software.

Herein, the luminance signal included in the image signal inputted to the image signal processor 2 is a luminance signal Y0. The luminance signal Y0 is inputted to the delay device 231 and the Gaussian filter 232. The Gaussian filter is a low-pass filter that extracts extremely low-frequency signals using a Gaussian function. As illustrated in FIG. 13, frequency characteristic FG of the Gaussian filter 232 has an extremely low cutoff frequency.

The Gaussian filter 232 may be replaced with a low-pass filter having an extremely low cutoff frequency and including a large number of taps.

The delay device 231 delays the luminance signal Y0 by the time needed for processing at the Gaussian filter 232, and outputs the resultant signal as a luminance signal Y1. The Gaussian filter 232 extracts a low-frequency component signal Y2 from the luminance signal Y0.

As illustrated in (a) of FIG. 14, when the luminance signal Y0 is an edge signal represented by a solid line, the low-frequency component signal Y2 has a waveform represented by a dashed line. As illustrated in FIG. 13, the low-frequency component signal Y2 occupies a frequency band limited by the frequency characteristic FG.

The subtractor 233 subtracts the low-frequency component signal Y2 from the luminance signal Y1 to output the resultant signal as a high-frequency component signal Y3 illustrated in (b) of FIG. 14. Since the subtractor 233 subtracts the low-frequency component signal Y2 from the luminance signal Y1, which spans the full range of frequencies, the high-frequency component signal Y3 occupies a range of frequencies illustrated in FIG. 13.

The high-frequency component signal Y3 outputted from the subtractor 233 is inputted to the low-pass filter 235. The low-pass filter 235 has a frequency characteristic FL illustrated in FIG. 13. The cutoff frequency of the low-pass filter 235 is higher than the cutoff frequency of the Gaussian filter 232.

An outputted signal Y4 from the low-pass filter 235 is a signal obtained by extracting a signal having lower frequencies, from the high-frequency component signal Y3 through the frequency characteristic FL. The outputted signal Y4 has a waveform illustrated in (c) of FIG. 14. The outputted signal Y4 is referred to as a lower frequency-side high-frequency component signal Y4. The lower frequency-side high-frequency component signal Y4 is inputted to the multiplier 236.

The multiplier 236 multiplies the lower-frequency side high-frequency component signal Y4 by a gain G1 to produce a correction component signal Y5 illustrated in (d) of FIG. 14. The gain G1 is to control the effect of the image quality corrector 23 improving the contrast at the contour part in the image. The gain G1 is normally a positive number greater than 0 and less than 1.

The delay device 234 further delays the luminance signal Y1 by the time needed for processing at the low-pass filter 235 and multiplier 236, and outputs the resultant signal as a luminance signal Y6. The adder 237 adds up the luminance signal Y6 and the correction component signal Y5 to output the resultant signal as a corrected luminance signal Y7 illustrated in (e) of FIG. 14.

As described above, the image quality corrector 23 preferably treats the luminance signal Y0 with the image quality correction process that emphasizes the contrast at a part corresponding to edge signals in the luminance signal Y0.

Specifically, for an edge signal in which the luminance rises from a first level to a second level, luminance values are reduced at the corner of the edge where the luminance starts to rise from the first level. Moreover, the luminance values are increased at the corner of the edge where the rising luminance reaches the second level.

For an edge signal in which the luminance decreases from the second level to the first level, the luminance values are increased at the corner of the edge where the luminance starts to decrease from the second level. Moreover, the luminance values are reduced at the corner of the edge where the falling luminance reaches the first level.

Figure 15A:
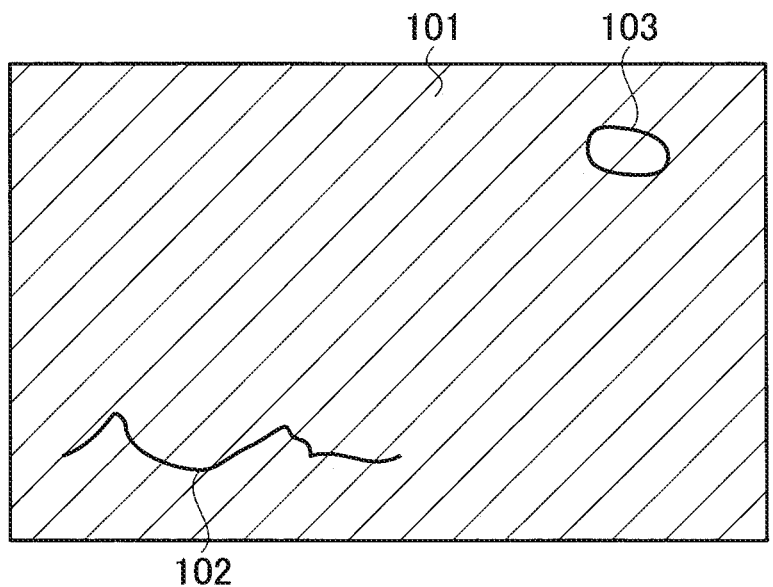
FIG. 15A is a diagram illustrating an image not subjected to image quality correction by the image quality corrector.
Figure 15B:
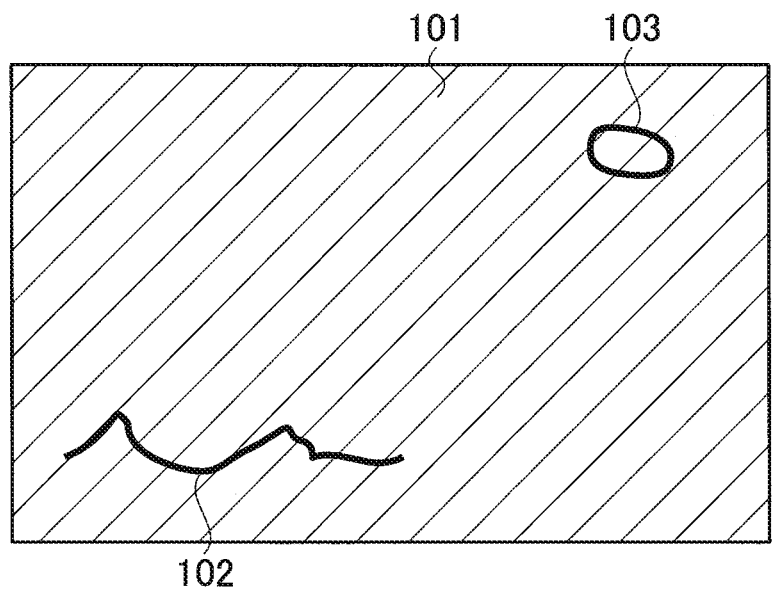
FIG. 15B is a diagram conceptually illustrating an image subjected to image quality correction by the image quality corrector.

FIG. 15A is an image similar to FIGS. 3B, 6B, 8C, and 10B. By performing the above-described image quality correction process for the luminance signal (luminance signal Y0) included in the image signal, the contrast at the crack 102 and the dent 103 are emphasized as conceptually illustrated in FIG. 15B. The inspector is therefore able to more precisely identify the crack 102 and the dent 103 existing in the wall surface 101.

In FIG. 1, the body 10 may include a controller composed of a microcomputer or microprocessor inside, and the histogram analyzer 22 or both the histogram generator 21 and the histogram analyzer 22 may be provided for the controller. The histogram analyzer 22 or both the histogram generator 21 and the histogram analyzer 22 may be provided for the controller 51.

At least one of the lighting controller 511 and the distance controller 512, which are provided for the controller 51 in the aforementioned configuration, may be provided for the controller within the body 10.

The functions of the histogram generator 21, histogram analyzer 22, lighting controller 511, and distance controller 512 may be implemented by a computer program (an underwater imaging apparatus control program). The underwater imaging apparatus control program may be recorded in a non-transitory storage medium.

Specifically, the underwater imaging apparatus control program causes a computer to execute the following steps. First, the control program causes the computer to execute the step of dividing a range from the minimum to the maximum values of the luminance signal included in an image signal outputted by the imaging unit, which captures an image of a subject in the water, into plural luminance groups and generating histogram data representing the distribution of frequencies of the plural luminance groups.

Next, the control program causes the computer to execute the step based on the generated histogram data, analyzing the distribution of frequencies of the plural luminance groups. The control program causes the computer to execute a step of adjusting the distance between the subject and the lighting unit that illuminates the subject, in accordance with the result of the analysis for the histogram data.

Second Embodiment

Figure 16:
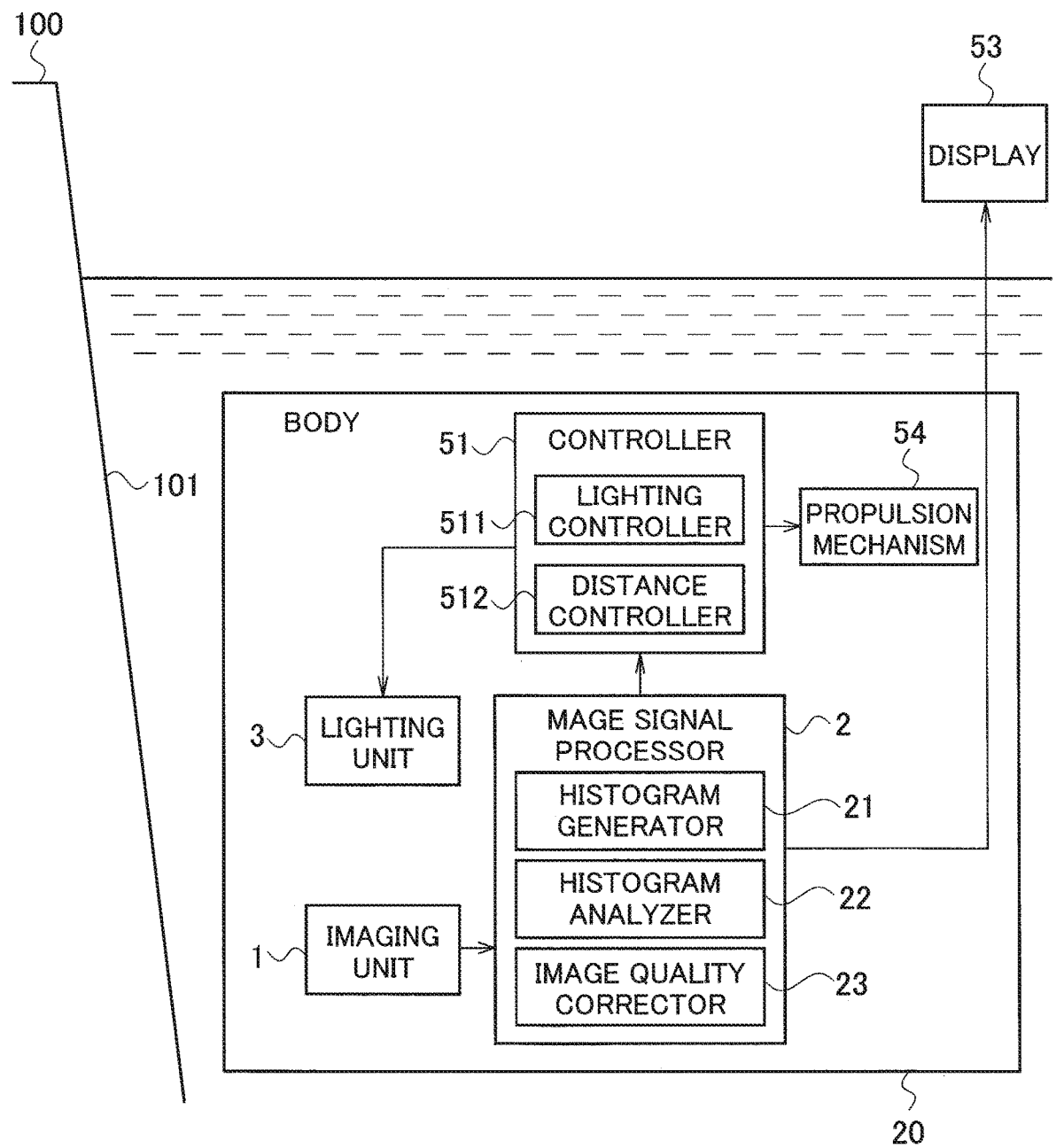
FIG. 16 is a block diagram illustrating an underwater imaging apparatus according to the second embodiment.

In an underwater imaging apparatus according to the second embodiment illustrated in FIG. 16, the same components as those of the underwater imaging apparatus according to the first embodiment, which is illustrated in FIG. 1, are given the same reference numerals, and the description thereof is omitted.

As illustrated in FIG. 16, the underwater imaging apparatus according to the second embodiment includes a propulsion mechanism 54 such as a screw, so that the body 20 itself can move toward or away from the water surface 101. The distance controller 512 controls the propulsion mechanism 54 so that the lighting unit 3 (that is, the body 20) moves toward or away from the water surface 101.

The underwater imaging apparatus according to the second embodiment also operates as illustrated in FIG. 2. The method of controlling the underwater imaging apparatus according to the second embodiment executes control as illustrated in FIG. 2. The program for controlling the underwater imaging apparatus according to the second embodiment also causes a computer to execute steps as illustrated in FIG. 2.

Third Embodiment

Figure 17:
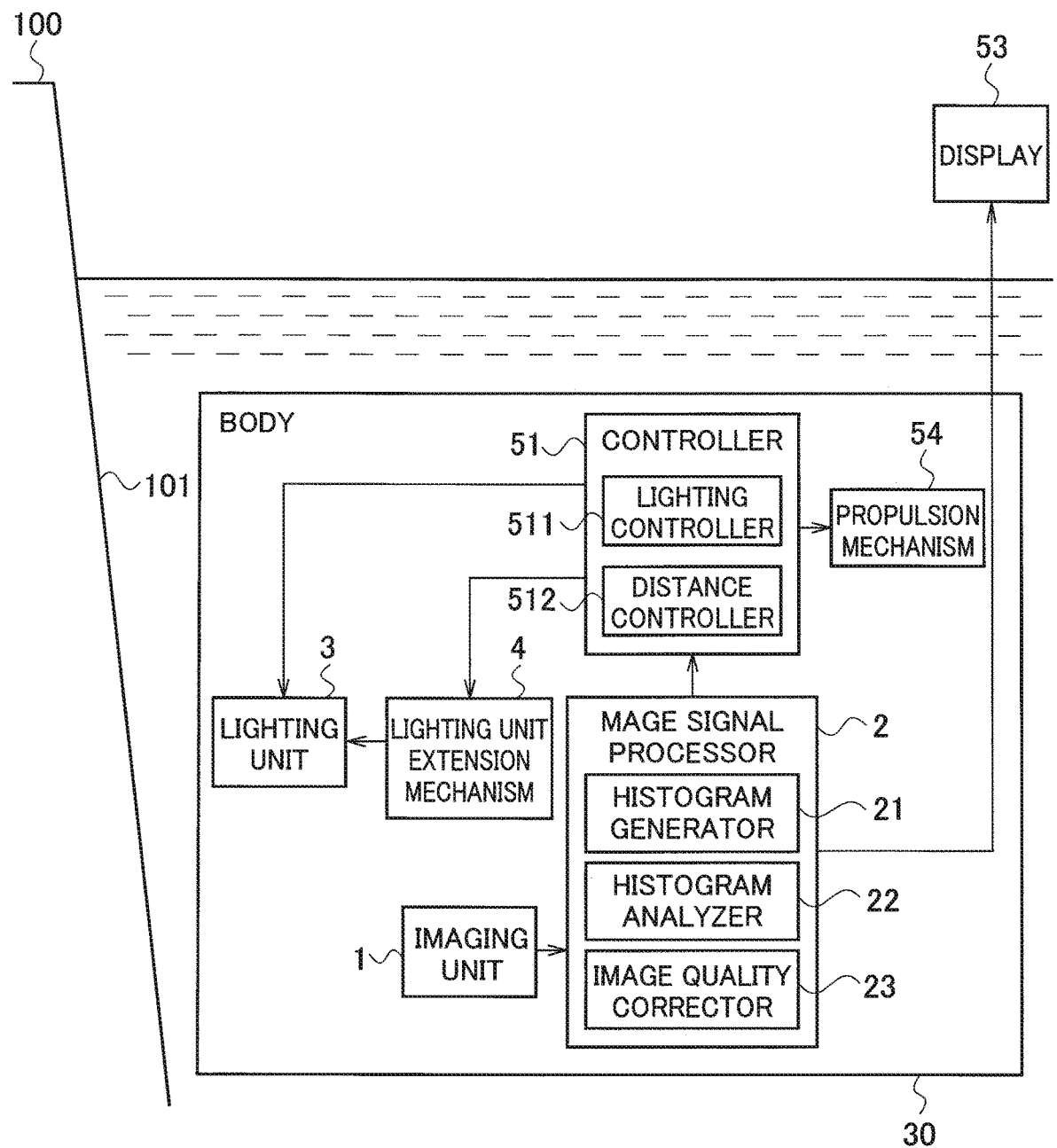
FIG. 17 is a block diagram illustrating an underwater imaging apparatus according to the third embodiment.

In an underwater imaging apparatus according to the third embodiment illustrated in FIG. 17, the same components as those of the underwater imaging apparatus according to the second embodiment, which is illustrated in FIG. 16, are given the same reference numerals, and the description thereof is omitted.

In the underwater imaging apparatus according to the third embodiment, which is illustrated in FIG. 17, a body 30 includes a lighting unit extension mechanism 4 so that only the lighting unit 3 moves toward or away from the water surface 101. The lighting unit extension mechanism 4 can be composed of an extensible arm, to the top of which the lighting unit 3 is attached, for example.

The distance controller 512 controls the lighting unit extension mechanism 4 so that the lighting unit 3 moves toward or away from the wall surface 101. The distance controller 512 may control the propulsion mechanism 54 so that the body 30 moves toward or away from the wall surface 101 while controlling the lighting unit extension mechanism 4 so that the lighting unit 3 moves toward or away from the wall surface 101.

The lighting unit extension mechanism 4, which moves only the lighting unit 3 toward or away from the wall surface 101, may be provided for the body 10, which is illustrated in FIG. 1.

As described above, in accordance with the underwater imaging apparatus, the method for controlling the underwater imaging apparatus, and the program for controlling the underwater imaging apparatus according to each embodiment, it is possible to provide an image that enables a subject in the water to be precisely identified.

The present invention is not limited to each embodiment described above and can be variously changed without departing from, the scope of the invention.

What is claimed is:

1. An underwater imaging apparatus, comprising:
    an imaging unit configured to capture an image of a subject in the water;
    a lighting unit configured to illuminate the subject;
    a histogram generator configured to divide a range from the minimum to the maximum luminance values of a luminance signal included in an image signal generated by capturing the image of the subject into a plurality of luminance groups, and to generate a histogram representing the distribution of frequencies of the plurality of luminance groups;
    a histogram analyzer configured, based on the generated histogram, to analyze how the luminance values are distributed in a low-luminance range, a high-luminance range, and a middle-luminance range, the low-luminance rang being located on a low-luminance side of the histogram, the high-luminance range being located on a high-luminance side of the histogram, and the middle-luminance range being located between the low and high-luminance ranges of the histogram; and
    a distance controller configured to control to adjust the distance between the subject and the lighting unit according to the result of the analysis for the histogram-data by the histogram analyzer,
    wherein the histogram analyzer calculates a first sum of the frequencies in the low-luminance range, a second sum of the frequencies in the middle-luminance range, a third sum of the frequencies in the high-luminance range, and a total sum of the frequencies in the histogram,
    wherein the histogram analyzer calculates a low-luminance concentration rate, a middle-luminance concentration rate, and a high-luminance concentration rate, the low-luminance concentration rate being a ratio of the first sum of the frequencies to the total sum of the frequencies, the middle-luminance concentration rate being a ratio of the second sum of the frequencies to the total sum of the frequencies, and the high-luminance concentration rate being a ratio of the third sum of the frequencies to the total sum of the frequencies,
    and wherein the distance controller controls the lighting unit so as to move away from the subject, when the histogram analyzer analyzes that the low-luminance concentration rate is greater than the middle-luminance concentration rate, and that the high-luminance concentration rate is greater than the middle-luminance concentration rate.

2. The underwater imaging apparatus according to claim 1, wherein
    the distance controller controls the lighting unit so as to move toward the subject, when the histogram analyzer analyzes that the low-luminance concentration rate or the middle-luminance concentration rate is greater than a first value.

3. The underwater imaging apparatus according to claim 2, further comprising a lighting controller configured to control the brightness of illumination by the lighting unit, wherein
    the lighting controller controls the lighting unit so as to reduce the brightness of illumination by the lighting unit and the distance controller controls the lighting unit so as to move toward the subject, when the histogram analyzer analyzes that the high-luminance concentration rate is greater than a second value.

4. The underwater imaging apparatus according to claim 1, further comprising an image quality corrector configured to emphasize contrast at edge part in the luminance signal.

5. An underwater imaging apparatus control method, comprising:
    by an imaging unit, capturing an image of a subject in the water;
    by a histogram generator, dividing a range from the minimum to the maximum luminance values of a luminance signal included in an image signal generated by capturing the image of the subject, into a plurality of luminance groups, and generating histogram representing the distribution of frequencies of the plurality of luminance groups;
    by a histogram analyzer, based on the generated histogram, analyzing how the luminance values are distributed in a low-luminance range, a high-luminance range, and a middle-luminance range, the low-luminance range being located on a low-luminance side of the histogram, the high-luminance range being located on a high-luminance side of the histogram, and the middle-luminance range being located between the low and high-luminance ranges of the histogram;
    by the histogram analyzer, calculating a first sum of the frequencies in the low-luminance range, a second sum of the frequencies in the middle-luminance range, a third sum of the frequencies in the high-luminance range, and a total sum of the frequencies in the histogram;
    by the histogram analyzer, calculating a low-luminance concentration rate, a middle-luminance concentration rate, and a high-luminance concentration rate, the low-luminance concentration rate being a ratio of the first sum of the frequencies to the total sum of the frequencies the middle-luminance concentration rate being a ratio of the second sum of the frequencies to the total sum of the frequencies and the high-luminance concentration rate being a ratio of the third sum of the frequencies to the total sum of the frequencies; and
    by a distance controller, controlling the lighting unit so as to move away from the subject, when the histogram analyzer analyzes that the low-luminance concentration rate is grater than the middle-luminance concentration rate, and that the high-luminance concentration rate is greater than the middle-luminance concentration rate.

6. An underwater imaging apparatus control program stored in a non-transitory storage medium, the program causing a computer to execute:
    a step of dividing a range from the minimum to the maximum luminance values of a luminance signal included in an image signal generated by capturing an image of a subject in the water into a plurality of luminance groups, and generating a histogram representing the distribution of frequencies of the plurality of luminance groups;

a step of, based on the generated histogram, analyzing how the luminance values are distributed in a low-luminance range, a high-luminance range, and a middle-luminance range, the low-luminance range being located on a low-luminance side of the histogram the high-luminance range being located on a high-luminance side of the histogram and the middle-luminance range being located between the low and high-luminance ranges of the histogram;

a step of calculating a first sum of the frequencies in the low-luminance range, a second sum of the frequencies in the middle-luminance range, a third sum of the frequencies in the high-luminance range, and a total sum of the frequencies in the histogram;

a step of calculating a low-luminance concentration rate, a middle-luminance concentration rate, and a high-luminance concentration rate, the low-luminance concentration rate being a ratio of the first sum of the frequencies to the total sum of the frequencies, the middle-luminance concentration rate being a ratio of the second sum of the frequencies to the total sum of the frequencies, and the high-luminance concentration rate being a ratio of the third sum of the frequencies to the total sum of the frequencies; and a step of controlling the lighting unit so as to move away from the subject when the histogram analyzer analyzes that the low-luminance concentration rate is greater than the middle-luminance concentration rate, and that the high-luminance concentration rate is greater than the middle-luminance concentration rate.

* * * * *